(12) United States Patent
Wu et al.

(10) Patent No.: US 12,723,699 B2
(45) Date of Patent: Sep. 1, 2026

(54) QUICK-RELEASE STRUCTURE

(71) Applicant: TILTA INC., Burbank, CA (US)

(72) Inventors: Sen Wu, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 36 days.

(21) Appl. No.: 18/938,589

(22) Filed: Nov. 6, 2024

(65) Prior Publication Data

US 2025/0146614 A1 May 8, 2025

(30) Foreign Application Priority Data

Nov. 8, 2023 (CN) ........................ 202323027195.2

(51) Int. Cl.
*F16M 11/00* (2006.01)
*F16M 11/04* (2006.01)
*G03B 17/56* (2021.01)

(52) U.S. Cl.
CPC ......... *F16M 11/041* (2013.01); *G03B 17/561* (2013.01)

(58) Field of Classification Search
None
See application file for complete search history.

(56) References Cited

U.S. PATENT DOCUMENTS 12,174,519 B1 * 12/2024 Zhu ...................... G03B 17/561
2013/0256484 A1 * 10/2013 Kessler .................. F16M 13/00 248/224.7
2014/0093314 A1 * 4/2014 Kessler ................ F16M 11/041 403/361
2020/0011473 A1 * 1/2020 Huang ................. F16M 11/041
2020/0272031 A1 * 8/2020 Zhu ........................ F16M 11/16
2024/0426417 A1 * 12/2024 Lin ...................... F16M 11/045
2025/0020268 A1 * 1/2025 Wang .................. G03B 17/561

FOREIGN PATENT DOCUMENTS

CN 113568259 A 10/2021

* cited by examiner

*Primary Examiner* — Steven M Marsh

(74) *Attorney, Agent, or Firm* — LOZA & LOZA, LLP; Derek W. Yeung

(57) ABSTRACT

The present disclosure introduces a quick-release structure pertaining to the technical realm of photographic auxiliary accessories. The structure comprises: a quick-release plate; a quick-release base featuring a limiting groove; and a quick-release assembly, which incorporates a pressing member and a triggering member, both elastically mounted on the quick-release base. The pressing member, adjacent to the limiting groove, serves to secure the quick-release plate within the limiting groove, whereas the triggering member is tasked with actuating the pressing member to disengage the quick-release plate from the limiting groove. The quick-release plate merely needs to be pressed into the quick-release base, causing the pressing member to lock automatically, thereby mounting the plate on the base. During unlocking, applying pressure to the triggering member with one hand prompts it to activate the pressing member, causing it to rotate relative to the quick-release base, thus releasing the plate.

10 Claims, 8 Drawing Sheets

QUICK-RELEASE STRUCTURE

CROSS-REFERENCE TO RELATED APPLICATIONS

The present application for patent claims priority to and the benefit of pending Chinese Application No. 2023230271952, filed Nov. 8, 2023, and hereby expressly incorporated by reference herein as if fully set forth below in its entirety and for all applicable purposes.

TECHNICAL FIELD

The present disclosure relates to the technical realm of photographic auxiliary accessories, specifically addressing a quick-release structure.

INTRODUCTION

During photography with equipment like cameras, personnel may use externally attached accessories, such as microphones or flashlights, based on various shooting demands. Occasionally, cameras can be mounted on gimbals or tripods, and at other times, cameras need to be detached for standalone use. Hence, connecting components that link cameras and photographic accessories (e.g., gimbals, tripods, or other functional parts) are utilized. These components facilitate the swift installation and detachment of cameras and mounting accessories. Currently, market-available connecting components are typically integrated and connect cameras and configured accessories via bolts. Detachment necessitates screw removal, which is cumbersome.

For instance, a Chinese patent with publication number CN113568259A discloses an assembly and disassembly component that achieves assembly and disassembly between two fixing parts by positioning a handle on the bottom shell's side and rotating it. During assembly and disassembly, personnel must rotate and unlock it along the connecting component's height direction. This setup requires one hand to hold the connecting component's base and the other to rotate the handle to the unlocked position, necessitating two-handed coordination. The process is relatively cumbersome.

BRIEF SUMMARY

The present disclosure introduces a quick-release structure that facilitates the swift installation and detachment of cameras and photographic accessories.

To fulfill this purpose, the present disclosure offers the following technical solution:

The present disclosure introduces a quick-release structure, including:

- a quick-release plate;
- a quick-release base featuring a limiting groove; and
- a quick-release assembly, which incorporates a pressing member and a triggering member, both elastically mounted on the quick-release base; the pressing member, adjacent to the limiting groove, serves to secure the quick-release plate within the limiting groove, whereas the triggering member is tasked with actuating the pressing member to disengage the quick-release plate from the limiting groove. In this application, the pressing member securely holds the quick-release plate within the limiting groove, while the triggering member unlocks the quick-release plate from the limiting groove, enabling swift installation and detachment between the quick-release plate and the quick-release base.

- wherein the quick-release base includes a retaining seat and a quick-release seat. The limiting groove is positioned on the retaining seat, while the quick-release seat connects to the retaining seat to form an accommodating groove that communicates with the limiting groove; within this groove, the pressing member and triggering member are movably mounted, with the pressing member adjacent to the limiting groove.
- wherein a pressing portion is positioned at a first end of the pressing member adjacent to the limiting groove, and a locking portion is positioned at a second end of the quick-release plate near the retaining seat; when the locking portion is housed within the limiting groove, the pressing portion engages with the locking portion.
- wherein a locking groove is positioned on the locking portion and a locking protrusion is positioned on the pressing portion, with the protrusion capable of being engaged within the groove.
- wherein the quick-release assembly also incorporates an elastic member; a swinging portion is located at a first end of the pressing member opposite the pressing portion; the triggering member engages the swinging portion, with a first end of the elastic member connected to the swinging portion and a second end to the retaining seat or the triggering member, facilitating the pressing portion's locking of the locking portion; when assembling the quick-release plate and the quick-release base in this application, the locking protrusion engages with the locking groove, placing the pressing portion and the locking portion in a locked state; at this juncture, pressing the triggering member causes it to push the swing portion of the pressing member, which in turn displaces the locking protrusion away from the locking groove via the swing portion; this action unlocks the pressing portion from the locking portion, thereby enabling swift separation of the quick-release plate and the quick-release base; furthermore, during detachment, pressing the triggering member alone suffices for one-handed, one-touch unlocking, rendering the installation and detachment processes relatively straightforward and convenient.
- wherein the triggering member includes a triggering part and a connecting seat, both contained within the accommodating groove; a first end of the triggering part attaches to the connecting seat, while a second end protrudes beyond the groove; the clastic member is housed within the connecting seat, with a first end distant from the swinging portion connected to the retaining seat, the connecting seat, or the triggering part; a second end of the connecting seat opposite the triggering part abuts the swinging portion.
- wherein a strip hole is set in the connecting seat and a limiting protrusion is positioned on a first side of the retaining seat opposite the limiting groove; the limiting protrusion extends through the strip hole to restrict the connecting seat's movement direction.
- wherein a notch is set on one sidewall of the limiting groove and a rotating groove is set on the quick-release seat; the pressing portion is rotatably mounted within the rotating groove, while the locking protrusion engages the limiting groove through the notch, enabling abutment and detachment between the locking protrusion and the locking groove.

wherein the rotating groove is interconnected with the limiting groove via a notch.

wherein a fixed column is also incorporated, either on the side of the retaining seat facing away from the limiting groove or on the side of the triggering member facing the retaining seat; the end of the elastic member distant from the swing portion is attached to this fixed column.

wherein the locking protrusion is configured as an eccentric circular structure; in this application, when the swing portion moves due to the pulling or pushing force exerted by the elastic member or the triggering member, it compels the pressing portion to rotate within the rotating groove while concurrently causing the locking protrusion to undergo an eccentric motion; similarly, when the locking protrusion itself is compressed by the locking portion of the quick-release plate, it also undergoes an eccentric motion; specifically: during installation, pressing the locking portion into the limiting groove causes the locking protrusion to execute an eccentric motion under the compressive force of the locking portion; consequently, the elastic member stretches slightly under the impetus of the locking protrusion; once the locking portion fully enters the limiting groove, the locking protrusion reverts to its original position and performs an eccentric motion to snap into the locking groove; the spring then contracts, further urging the locking protrusion into an eccentric motion, thereby tightening the engagement between the locking protrusion and the locking groove; during detachment, pressing the triggering member propels the swing portion, causing the locking protrusion to execute a downward eccentric rotation, displacing it from the locking groove and thus unlocking the locking portion from the pressing portion; this action facilitates the unlocking and detachment of the quick-release plate and the quick-release base; upon releasing the triggering member, the clastic member draws the swing portion back to its original position, prompting the locking protrusion to perform an upward eccentric rotation and reset.

wherein a first limiting surface is set on the outer sidewall of the locking portion and a second limiting surface on the inner sidewall of the limiting groove; the first and second limiting surfaces fit together to provide a secure connection.

wherein a detachable first interface is set on the quick-release plate and a detachable second interface is set on the quick-release base; in this application, both the quick-release plate and the quick-release base are equipped with detachable interfaces for connecting to cameras and accessories; these interfaces allow for easy detachment and replacement, facilitating adaptability to various accessories.

Moreover, an elastic positioning column is provided on the side of the first screw interface of the quick-release plate, facilitating positioning when attaching the quick-release plate to accessories or cameras.

Beneficial Effects: In comparison to prior art, the invention's merits manifest during installation, where the quick-release plate merely needs to be pressed into the quick-release base, causing the pressing member to lock automatically, thereby mounting the plate on the base. During unlocking, applying pressure to the triggering member with one hand prompts it to activate the pressing member, causing it to rotate relative to the quick-release base, thus releasing the plate. This facilitates one-touch unlocking, casing the installation and removal of both the quick-release plate and the base, and offering the convenience of effortless assembly and disassembly.

REFERENCE NUMERALS OF ELEMENTS

1. quick-release plate, 11. locking portion, 12. locking groove, 13. first limiting surface.

2. quick-release base, 21. retaining seat, 211. notch, 212. fixed column, 213. second limiting surface, 214. limiting protrusion, 2141. second through-hole, 22. quick-release seat, 221. rotating groove; 222. first through-hole.

3. quick-release assembly, 31. pressing member, 311. pressing portion, 312. locking protrusion, 313. swinging portion, 32. triggering member, 321. triggering part, 322. connecting seat, 3221. clearance opening, 3222. installation groove, 3223. strip hole, 33. elastic member.

4. first interface, 5. second interface, 6. elastic positioning pillar, A. limiting groove, B. accommodating groove, C. screw hole, D. screw.

DETAILED DESCRIPTION

To clarify the objectives, technical solutions, and advantages of the present disclosure, further detailed descriptions are provided below in conjunction with the accompanying drawings and an exemplary embodiment. It should be noted that the specific embodiment presented herein is solely for the purpose of illustrating the present disclosure and is not meant to restrict its scope.

Figure 1:
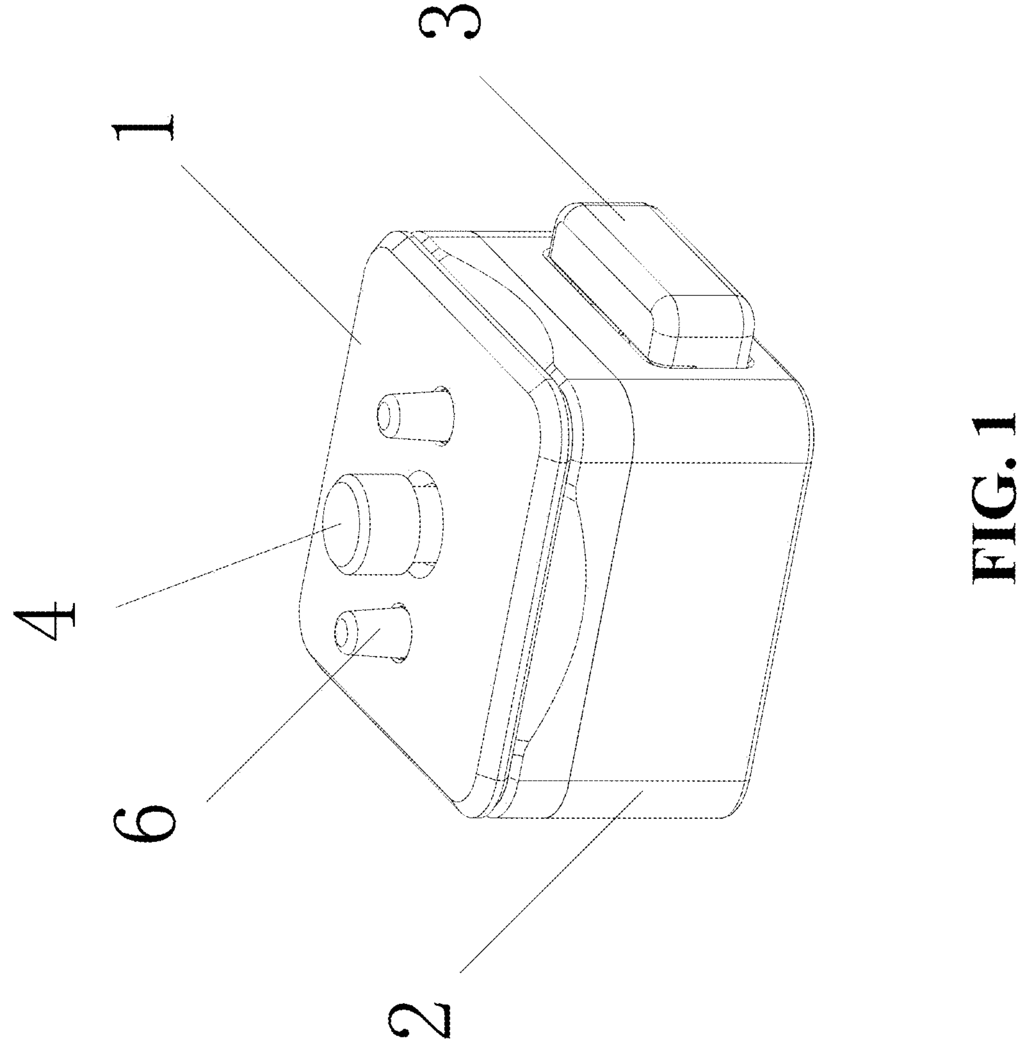
FIG. 1 is a diagram illustrating a quick-release structure according to some aspects of the disclosure.
Figure 2:
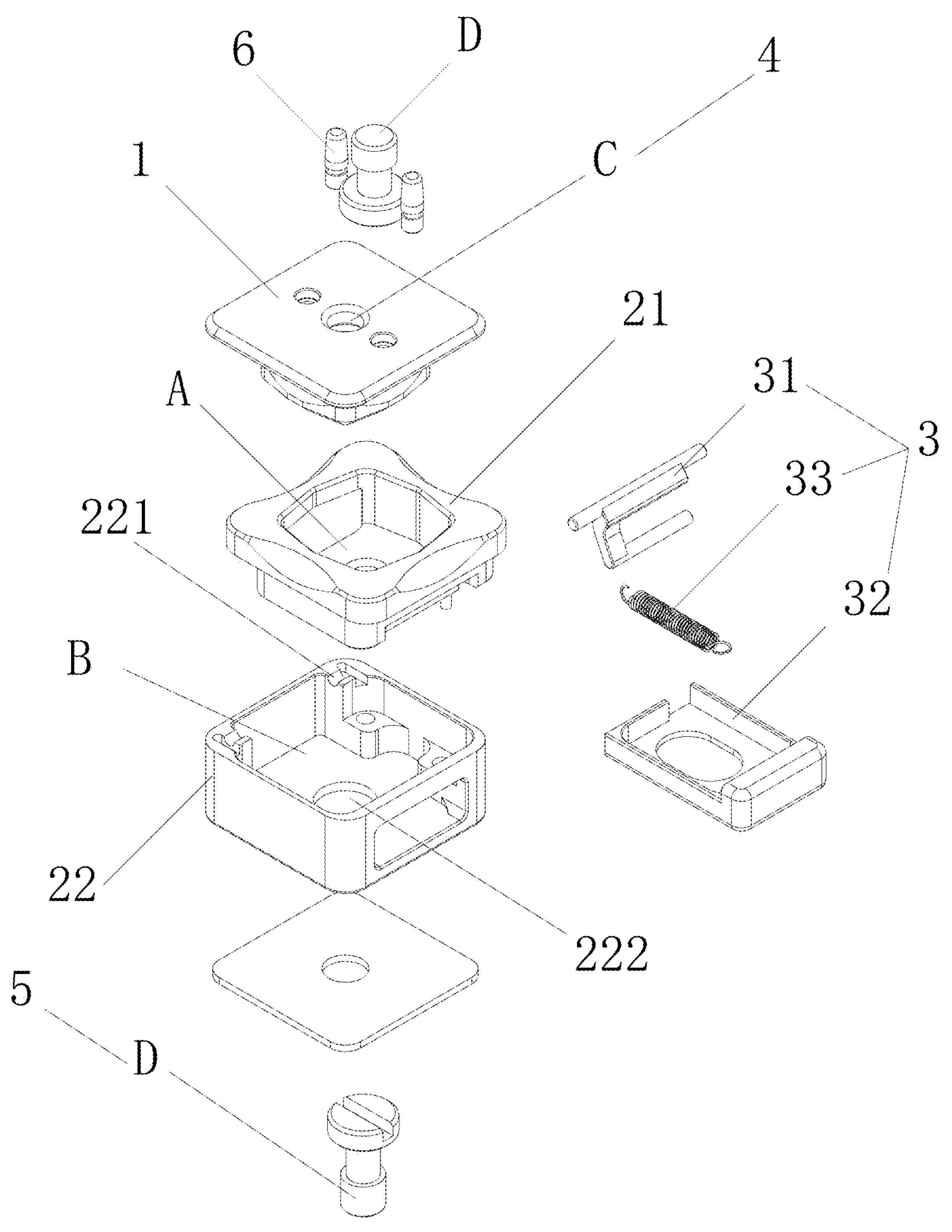
FIG. 2 is a diagram illustrating an exploded view of the quick-release structure according to some aspects of the disclosure.
Figure 3:
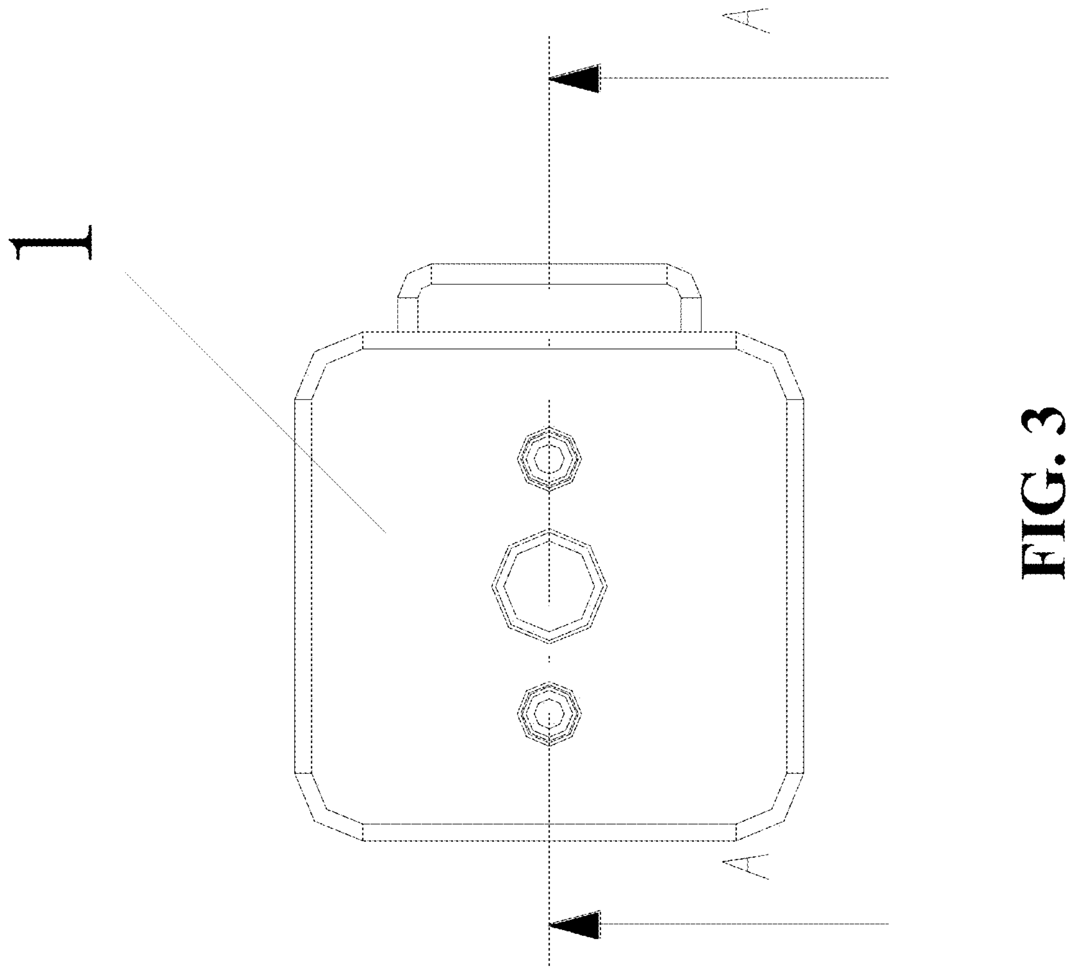
FIG. 3 is a top view of the quick-release structure of the disclosure.
Figure 4:
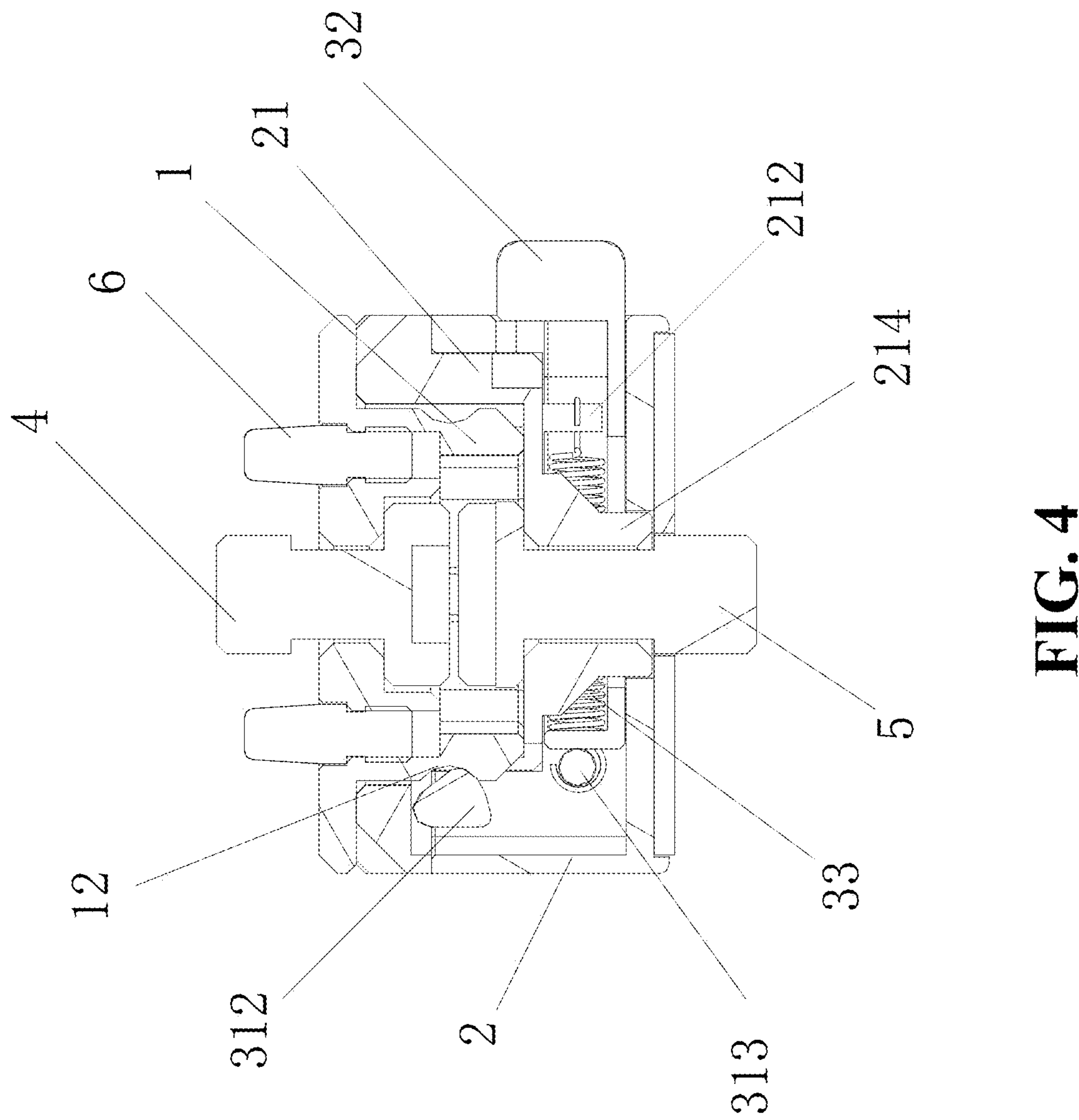
FIG. 4 is a diagram illustrating a sectional view at the plane line A-A in FIG. 3.
Figure 5:
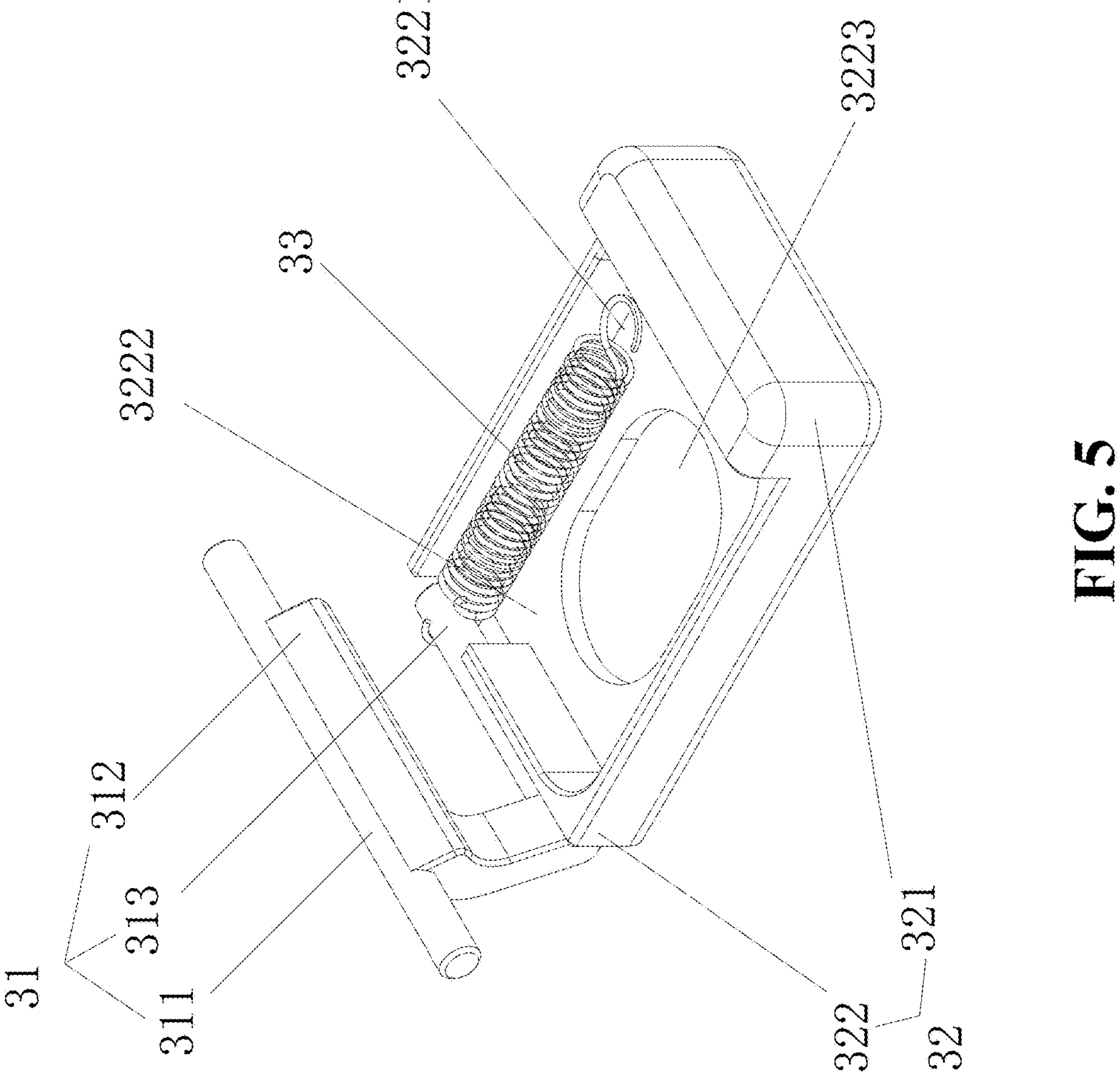
FIG. 5 is a diagram illustrating a quick-release assembly according to some aspects of the disclosure.
Figure 6:
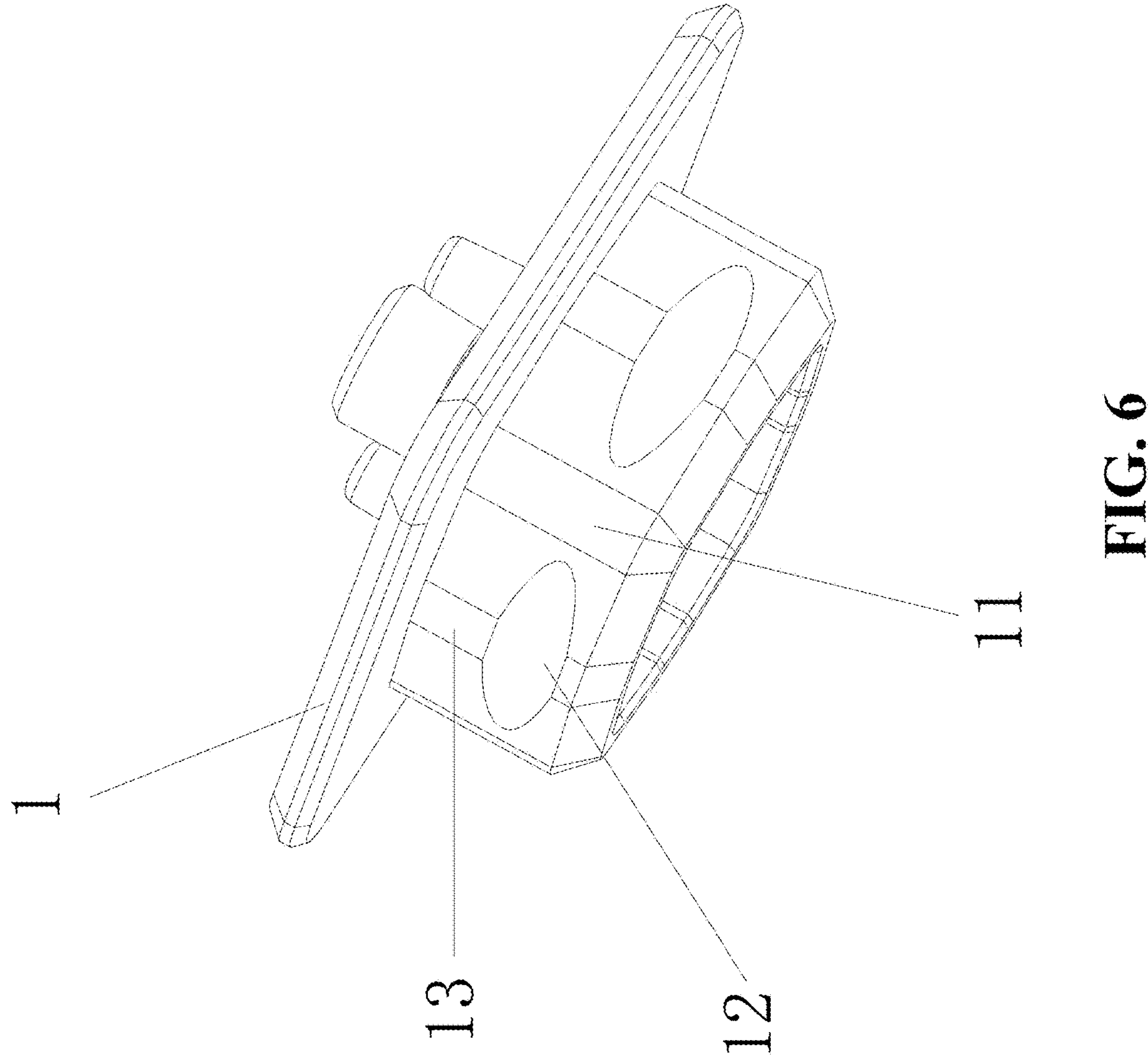
FIG. 6 is a diagram illustrating of a quick-release plate according to some aspects of the disclosure.
Figure 7:
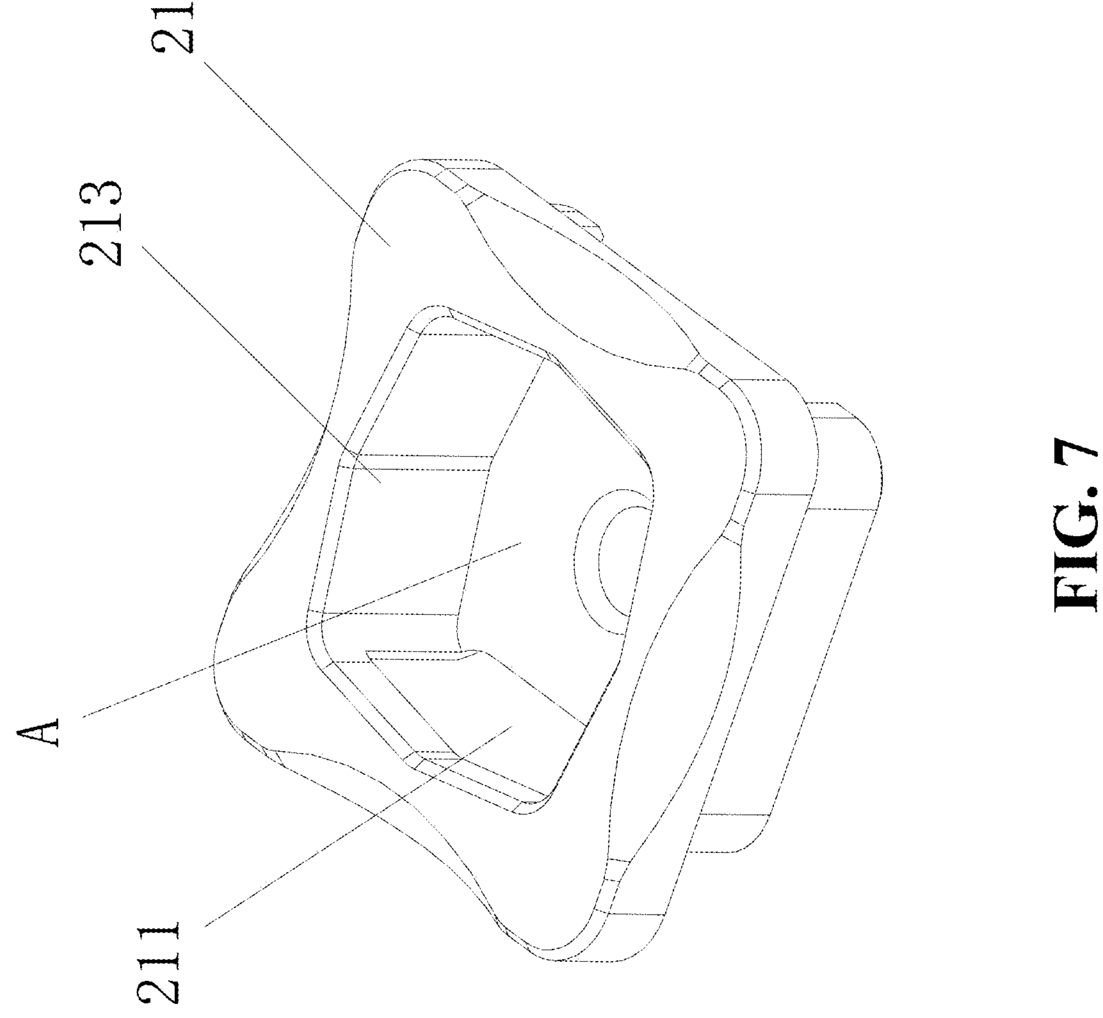
FIG. 7 is a diagram illustrating a first view of a retaining seat according to some aspects of the disclosure.
Figure 8:
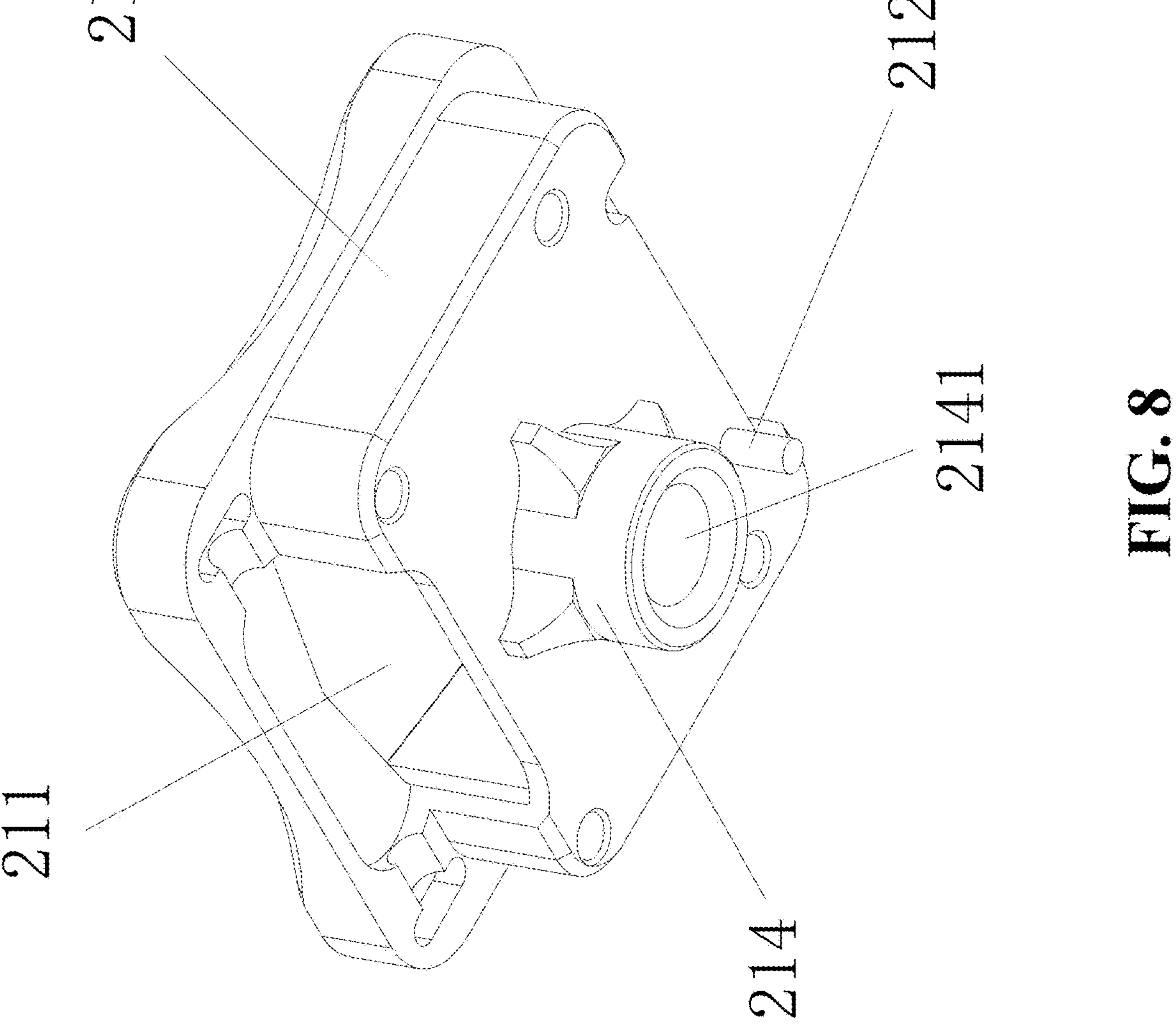
FIG. 8 is a diagram illustrating a second view of the retaining seat according to some aspects of the disclosure.

Referring to FIGS. 1-8, the present disclosure provides a quick-release structure, including: a quick-release plate 1, a quick-release base 2 featuring a limiting groove A, and a quick-release assembly 3, which incorporates a pressing member 31 and a triggering member 32, the pressing member 31 is configured to be elastically mounted on the quick-release base 2, the triggering member 32 is configured to be abut or support the pressing member 31; the pressing member 31, adjacent to the limiting groove A, serves to secure the quick-release plate 1 within the limiting groove A, whereas the triggering member 32 is tasked with actuating the pressing member 31 to disengage the quick-release plate 1 from the limiting groove A. In this application, the pressing member 31 securely holds the quick-release plate 1 within the limiting groove A, while the triggering member 32 unlocks the quick-release plate 1 from the limiting groove A, enabling swift installation and detachment between the quick-release plate 1 and the quick-release base 2. In some examples, the groove A can be a recess.

In the present disclosure, during the installation of the quick-release structure, the quick-release plate 1 is pressed into the quick-release base 2. As the pressing member 31 is elastically connected to the quick-release base 2, it is displaced by the quick-release plate 1 during this process. Once the quick-release plate is securely installed within the limiting groove A, the pressing member 31, under the influence of elastic force, automatically locks into place, thereby achieving the assembly between the quick-release plate 1 and the quick-release base 2. To unlock, simply press the triggering member 32 with one hand, causing it to activate the pressing member 31 to rotate relative to the quick-release base 2 and release the quick-release plate 1, allowing for effortless one-touch unlocking. When the quick-release plate 1 is released, the pressing member 31 resiliently reset under the action of the elastic force, and the pressing member 31 drives the triggering member 32 to reset elastically.

This design facilitates the disassembly and reassembly of the quick-release plate 1 and the quick-release base 2, offering the advantages of case of installation and removal.

Moreover, the quick-release base 2 includes a retaining seat 21 and a quick-release seat 22. The limiting groove A is positioned on the retaining seat 21, while the quick-release seat 22 connects to the retaining seat 21 to form an accommodating groove B that communicates with the limiting groove A. In some examples, the groove B can be a recess. Within this groove, the pressing member 31 and triggering member 32 are movably mounted, with the pressing member 31 adjacent to the limiting groove A. In the present disclosure, the retaining seat 21 and the quick-release seat 22 can be detachably connected or integrated formed.

Moreover, a pressing portion 311 is positioned at a first end of the pressing member 31 adjacent to the limiting groove A, and a locking portion 11 is positioned at a second end of the quick-release plate 1 near the retaining seat 21. When the locking portion 11 is housed within the limiting groove A, the pressing portion 311 engages with the locking portion 11.

Moreover, a locking groove 12 is positioned on the locking portion 11 and a locking protrusion 312 is positioned on the pressing portion 311, with the protrusion 312 is configured to be at least partially within the groove 12.

Moreover, the quick-release assembly 3 can incorporate an elastic member 33. A swinging portion 313 is located at a first end of the pressing member 31 opposite the pressing portion 311. The triggering member 32 is configured to abut or brace the swinging portion 313, with a first end of the elastic member 33 connected to the swinging portion 313 and a second end of the elastic member 33 connected to the retaining seat 21 or the triggering member 32, facilitating the locking between the pressing portion 311 and the locking portion 11. In this application, when the quick-release plate 1 is assembled with the quick-release base 2, the pressing member 31, connected to the retaining seat 21 or the triggering member 32 via the elastic member 33, is displaced by the quick-release plate 1 as it is pressed into the limiting groove A. Upon installation within the limiting groove A, the pressing member 31, under the action of the elastic member 33, automatically locks the quick-release plate 1 in place. The locking protrusion 312 is configured to be as least partially within the locking groove 12, placing the locking protrusion 312 and the locking portion 11 in a locked state. Moreover, pressing the triggering member 32 causes it to push the swing portion 313 of the pressing member 31, which in turn moves the locking protrusion 312 away from the locking groove 12 via the swing portion 313. This action unlocks the locking protrusion 312 from the locking portion 11, thereby enabling swift separation of the quick-release plate 1 and the quick-release base 2. Furthermore, during detachment, pressing the triggering member 32 alone enables one-handed, one-touch unlocking, rendering the installation and detachment processes relatively straightforward and convenient.

Moreover, the triggering member 32 includes a triggering part 321 and a connecting seat 322, both contained within the accommodating groove B. A first end of the triggering part 321 attaches to the connecting seat 322, while a second end protrudes beyond the groove B. The clastic member 33 is housed within the connecting seat 322, with a first end distant from the swinging portion 313 connected to the retaining seat 21, the connecting seat 322, or the triggering part 321. A second end of the connecting seat 322 opposite the triggering part 321 is configured to abut or brace the swinging portion 313. In the present disclosure, pressing the triggering part 321 actuates the connecting seat 322 to move along the accommodating groove B, triggering the movement of the swinging portion 313. Upon releasing the triggering part 321, the elastic member 33 resets the connecting seat 322 and, consequently, the triggering part 321. The inclusion of the connecting seat 322 enhances the stability of the quick-release assembly 3 during movement and ensures that the connecting seat 322 effectively triggers the movement of the swinging portion 313.

In the present disclosure, the connecting seat 322 features a clearance opening 3221 to allow the elastic member 33 to pass through. Specifically, the connecting seat 322 has an installation groove 3222 (or recess) that communicates with the clearance opening 3221. The elastic member 33 is housed within the installation groove 3222, with one end passing through the clearance opening 3221 to connect to the swinging portion 313 and the other end connecting to the retaining seat 21, the connecting seat 322, or the triggering part 321.

Moreover, taking the connection between the elastic member 33 and the retaining seat 21 for instance, specifically, a fixed column 212 is also incorporated, either on the side of the retaining seat 21 facing away from the limiting groove A or on the side of the triggering member 32 facing the retaining seat 21. The end of the elastic member 33 distant from the swing portion 313 is attached to this fixed column 212.

Moreover, a notch 211 is set on one sidewall of the limiting groove A, and a rotating groove 221 is set on the quick-release seat 22. The pressing portion 311 is rotatably mounted within the rotating groove 221, while the locking protrusion 312 engages the limiting groove A through the notch 211, enabling abutment and detachment between the locking protrusion 312 and the locking groove 12.

Furthermore, the rotating groove 221 communicates with the limiting groove A through the notch 211.

Furthermore, the locking protrusion 312 can be configured as an eccentric circular structure. In this application, when the swing portion 313 moves due to the pulling or pushing force exerted by the elastic member 33 or the triggering member 32, it compels the pressing portion to rotate within the rotating groove 221 while concurrently causing the locking protrusion 312 to undergo an eccentric motion. Similarly, when the locking protrusion 312 itself is compressed by the locking portion 11 of the quick-release plate 1, it also undergoes an eccentric motion. Specifically, during installation, pressing the locking portion 11 into the limiting groove A causes the locking protrusion 312 to execute an eccentric motion under the compressive force of the locking portion 11. Consequently, the elastic member 33 stretches slightly under the impetus of the locking protrusion 312. Once the locking portion 11 fully enters the limiting groove A, the locking protrusion 312 reverts to its original position and performs an eccentric motion to snap into the locking groove 12. The elastic member 33 (e.g., a spring) then contracts, further urging the locking protrusion 312 into an eccentric motion, thereby tightening the engagement between the locking protrusion 312 and the locking groove 12. During detachment, pressing the triggering member 32 propels the swing portion 313, causing the locking protrusion 312 to execute a downward eccentric rotation, displacing it from the locking groove 12 and thus unlocking the locking portion 11 from the pressing portion 311. This action facilitates the unlocking and detachment of the quick-release plate 1 and the quick-release base 2. Upon releasing the triggering member 32, the elastic member 33 draws the swing portion 313 back to its original position, prompting the locking protrusion 312 to perform an upward eccentric rotation and reset.

Furthermore, a first limiting surface 13 is set on the outer sidewall of the locking portion 11 and a second limiting surface 213 on the inner sidewall of the limiting groove A. The first and second limiting surfaces fit together to provide a secure connection. In this application, at least one of the first limiting surface 13 and the second limiting surface 213 is designed as a "V" shaped limiting surface.

Furthermore, a detachable first interface 4 is set on the quick-release plate 1 and a detachable second interface 5 is set on the quick-release base 2. In this application, both the quick-release plate 1 and the quick-release base 2 are equipped with detachable interfaces for connecting to cameras and accessories. These interfaces allow for easy detachment and replacement. In the disclosure, the first interface 4 and the second interface 5 can be configured as screw holes C or screws D. When the interface is a screw hole C, it is suited for installing external cameras or accessories using screws. When the interface is a screw D, it is suited for installing external cameras or accessories with screw holes.

Additionally, when the second interface 5 is a screw D, the connecting seat 322 includes a strip hole 3223, the quick-release seat 22 has a first through-hole 222, and the retaining seat 21 protrudes towards the side opposite the limiting groove A to form a limiting protrusion 214. The limiting protrusion 214 passes through both the strip hole 3223 and the first through-hole 222 and features a second through-hole 2141. The screw D is threadingly engaged within the second through-hole 2141 and extends beyond the quick-release seat 22. This configuration restricts the movement direction of the connecting seat 322, preventing any deviation in its movement.

Moreover, an elastic positioning column 6 is provided on the side of the first screw interface of the quick-release plate 1, facilitating positioning when attaching the quick-release plate 1 to accessories or cameras.

The above description outlines a preferred embodiment of the present disclosure and is not intended to limit its scope. Any modifications, equivalent substitutions, and improvements made within the spirit and principles of this utility model should be considered within the scope of its protection.

What is claimed is:

1. A quick-release structure, comprising:

a quick-release plate;

a quick-release base comprising a limiting groove; and a quick-release assembly, which comprises a pressing member and a triggering member, and the pressing member is configured to be elastically mounted on the quick-release base, wherein the pressing member is configured to secure the quick-release plate within the limiting groove by a pressing portion positioned at one end of the pressing member, wherein the pressing portion comprises a locking protrusion configured as an eccentric circular structure, and the triggering member is configured to actuate the pressing member to disengage the quick-release plate from the limiting groove.

2. The quick-release structure according to claim 1, wherein the quick-release base comprises a retaining seat and a quick-release seat;

wherein the limiting groove is positioned at the retaining seat, and the quick-release seat connects to the retaining seat to form an accommodating groove that communicates with the limiting groove; and wherein the pressing member and triggering member are movably provided in the accommodating groove, with the pressing member being configured to secure the quick-release plate within the limiting groove.

3. The quick-release structure according to claim 2, wherein the pressing portion is positioned adjacent to the limiting groove, and a locking portion is positioned at the quick-release plate; and wherein when the locking portion is housed within the limiting groove, the pressing portion engages with the locking portion.

4. The quick-release structure according to claim 3, wherein a locking groove is positioned on the locking portion and the locking protrusion is positioned on the pressing portion, with the locking protrusion configured to be at least partially within the locking groove.

5. The quick-release structure according to claim 3, wherein the quick-release assembly further comprises an elastic member;

wherein a swinging portion is provided at one end of the pressing member opposite the pressing portion; and wherein the triggering member is configured to abut the swinging portion, with a first end of the elastic member connected to the swinging portion, and a second end of the elastic member connected to the retaining seat or the triggering member for causing the pressing portion to lock against the locking portion.

6. The quick-release structure according to claim 5, wherein the triggering member comprises a triggering part and a connecting seat, both contained within the accommodating groove;

wherein a first end of the triggering part connects to the connecting seat, while a second end of the triggering part protrudes beyond the accommodating groove; and wherein the elastic member is housed within the connecting seat, with a first end of the elastic member distant from the swinging portion connected to the retaining seat, the connecting seat, or the triggering part; and one end of the connecting seat opposite the triggering part is configured to abut the swinging portion.

7. The quick-release structure according to claim 6, wherein a strip hole is set in the connecting seat and a limiting protrusion is positioned on a first side of the retaining seat opposite the limiting groove; and wherein the limiting protrusion extends through the strip hole to restrict a movement direction of the connecting seat.

8. The quick-release structure according to claim 4, wherein a notch is set on one sidewall of the limiting groove and a rotating groove is set on the quick-release seat; and wherein the pressing portion is rotatably mounted within the rotating groove, while the locking protrusion engages the limiting groove through the notch, enabling abutment and detachment between the locking protrusion and the locking groove.

9. The quick-release structure according to claim 3, wherein a first limiting surface is set on an outer sidewall of the locking portion and a second limiting surface is set on an inner sidewall of the limiting groove; and wherein a shape of the first limiting surface is adapted to a shape of the second limiting surface.

10. The quick-release structure according to claim 1, wherein a detachable first interface is set on the quick-release plate and a detachable second interface is set on the quick-release base.

* * * * *